US010989732B2

(12) United States Patent
Yao et al.

(10) Patent No.: US 10,989,732 B2
(45) Date of Patent: Apr. 27, 2021

(54) WIRELESS PIEZOELECTRIC ACCELEROMETER AND SYSTEM

(71) Applicant: AGENCY FOR SCIENCE, TECHNOLOGY AND RESEARCH, Singapore (SG)

(72) Inventors: Kui Yao, Singapore (SG); Zhiyuan Shen, Singapore (SG); Chin Yaw Tan, Singapore (SG); Yi Fan Chen, Singapore (SG); Lei Zhang, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 856 days.

(21) Appl. No.: 15/302,976

(22) PCT Filed: Apr. 10, 2015

(86) PCT No.: PCT/SG2015/050068
§ 371 (c)(1),
(2) Date: Oct. 7, 2016

(87) PCT Pub. No.: WO2015/156741
PCT Pub. Date: Oct. 15, 2015

(65) Prior Publication Data
US 2017/0030944 A1 Feb. 2, 2017

(30) Foreign Application Priority Data
Apr. 10, 2014 (SG) .......................... 10201401417Q (51) Int. Cl.
*G01P 15/09* (2006.01)
*G01H 11/08* (2006.01)
(Continued)

(52) U.S. Cl.
CPC .......... *G01P 15/0915* (2013.01); *G01H 11/08* (2013.01); *G01P 15/0802* (2013.01);
(Continued)

(58) Field of Classification Search
CPC ............. G01P 15/0915; G01P 15/0802; G01P 15/0922; G01P 2015/0865; G01H 11/08; H04B 1/04
See application file for complete search history.

(56) References Cited

U.S. PATENT DOCUMENTS 3,727,084 A * 4/1973 Epstein ............... G01P 15/0915
310/329
5,130,600 A * 7/1992 Tomita .................... G01P 1/006
310/319
(Continued)

FOREIGN PATENT DOCUMENTS

WO WO 2014/050349 A1 4/2014
WO WO-2014050349 A1 * 4/2014 .............. G01M 7/00

OTHER PUBLICATIONS

English translation for WO2014050349. (Year: 2014).*
(Continued)

*Primary Examiner* — Xin Y Zhong
(74) *Attorney, Agent, or Firm* — Womble Bond Dickinson (US) LLP (57) ABSTRACT

Wireless piezoelectric accelerometers and systems are provided. A wireless piezoelectric accelerometer may comprise a piezoelectric sensing element configured to sense mechanical acceleration and produce an electrical charge signal in response of the sensed mechanical acceleration, a signal processing module (SPM) configured to convert the electrical charge signal into a voltage signal, and process and digitize the voltage signal, and a wireless module configured to modulate and transmit the digitized voltage signal as wireless signals. The piezoelectric sensing element, the SPM
(Continued)

and the wireless module are packaged in a casing. The casing comprises a metallic shielding chamber configured to enclose the piezoelectric sensing element. The casing further comprises a non-metallic portion located in relative to the wireless module to allow transmission of the wireless signals. Corresponding wireless piezoelectric accelerometer systems are also provided.

22 Claims, 9 Drawing Sheets

(51) Int. Cl.
*G01P 15/08* (2006.01)
*H04B 1/04* (2006.01)

(52) U.S. Cl.
CPC .. *G01P 15/0922* (2013.01); *G01P 2015/0865* (2013.01); *H04B 1/04* (2013.01)

(56) References Cited

U.S. PATENT DOCUMENTS

| | | | |
|---|---|---|---|
| 2003/0119220 A1* | 6/2003 | Mlcak | B81B 3/0089 438/52 |
| 2005/0017602 A1* | 1/2005 | Arms | B60C 23/0411 310/339 |
| 2006/0019135 A1 | 1/2006 | Curello et al. | |
| 2006/0156817 A1* | 7/2006 | Kai | G01P 15/123 73/514.16 |
| 2011/0285527 A1 | 11/2011 | Arms et al. | |
| 2012/0077441 A1* | 3/2012 | Howard | G08B 13/1427 455/41.2 |
| 2013/0176175 A1* | 7/2013 | Zusman | G01S 5/0226 342/458 |

OTHER PUBLICATIONS

PCT Notification of Transmittal of the International Search Report and the Written Opinion of the International Searching Authority, or the Declaration for PCT Counterpart Application No. PCT/SG2015/050068, 13 pp., (dated Aug. 3, 2015).

PCT Notification of Transmittal of the International Preliminary Report on Patentability (IPRP) for counterpart application No. PCT/SG2015/050068; dated Aug. 3, 2015; 6 pp.

* cited by examiner

WIRELESS PIEZOELECTRIC ACCELEROMETER AND SYSTEM

CROSS-REFERENCE TO RELATED APPLICATIONS

The present application is a U.S. National Phase Application under 35 U.S.C. § 371 of International Application No. PCT/SG2015/050068, filed on 10 Apr. 2015, entitled WIRELESS PIEZOELECTRIC ACCELEROMETER AND SYSTEM, which claims priority to Singapore Patent Application No. 10201401417Q, filed on 10 Apr. 2014.

TECHNICAL FIELD

The present invention relates to a piezoelectric accelerometer and a system comprising the piezoelectric accelerometer. In particular, it relates to a miniaturized piezoelectric accelerometer that is configured for wireless communication and a system comprising the miniaturized piezoelectric accelerometer.

BACKGROUND ART

Physical motion characteristics, for example vibration characteristics of a machine or structure changes with respect to its condition, is a reflection of its operation state and structural integrity. Thus, vibration monitoring is in high demand in industry for purposes of fault diagnosis or regular monitoring to determine if maintenance is required. Currently, the vibration measurement process usually requires time consuming installation of accelerometers on various parts of a machine or a structure. Current vibration measurement practice in industry also requires the use of electrical power and signal cables between the accelerometer and a signal analysis unit, requiring careful routing of the electrical power and signal cables to avoid interfering with the machine operation.

Piezoelectric accelerometers with wireless communication functions are able to eliminate the need for any cable connections with the accelerometer. Although great efforts have been made to integrate the sensing element, the power source and the communication function in one package, there are still difficulties for applying the existing wireless piezoelectric accelerometers to realize wireless vibration monitoring in many applications.

For example, the current wireless piezoelectric accelerometers use bulky piezoelectric ceramic materials as the sensing element resulting in an overall bulky package. The large mass and volume of the current wireless accelerometers introduce substantial interference to the machine operation, and in many cases, make it impossible to monitor small machines or machine parts.

Further, the existing wireless piezoelectric accelerometers typically have a high aspect ratio and are protruding out of the machine to be monitored. The structure of the typical accelerometers is unstable with highly elevated weight centres and hard to steadily mount on a machine, particularly with the widely used magnetic bases. The high aspect ratio package itself introduces resonances at lower frequencies, which limits the dynamic frequency range of the accelerometer installed for practical applications.

Typically, a wired accelerometer usually has a package design enclosing the sensing element and all the electrical circuit in one metal casing. The metal casing protects the sensor from environmental electromagnetic interference (EMI). In contrast, a wireless accelerometer communicates wirelessly through RF transmission, so that the accelerometer cannot be completely packaged within a metal casing, thus noise in a wireless accelerometer is often significantly higher than the wired accelerometer. Therefore, the package needs to be dedicatedly designed for the wireless accelerometer to provide enough protection from EMI with minimized noise and at the same time not block the communication path. In addition, the package of the accelerometer needs to be compact, and does not generate any mechanical resonance at the working frequency range of the accelerometer.

Further, due to the energy limit in small batteries and regulatory restrictions on the use of wireless RF transmission, wireless RF transmissions are often restricted to low output power, thus restricting the distance between the wireless accelerometer and base units, thereby limiting the operation range of a wireless accelerometer system.

Thus, what is needed is a miniaturized piezoelectric accelerometer that is configured to transmit wireless communication and a system able to operate the wireless accelerometer in a relatively extended range. Furthermore, other desirable features and characteristics will become apparent from the subsequent detailed description and the appended claims, taken in conjunction with the accompanying drawings and this background of the disclosure.

SUMMARY OF INVENTION

Presently disclosed is a wireless piezoelectric accelerometer, comprising:

a piezoelectric sensing element configured to sense mechanical acceleration and produce an electrical charge signal in response of the sensed mechanical acceleration;

a signal processing module (SPM) configured to convert the electrical charge signal into a voltage signal, and process and digitize the voltage signal; and a wireless module configured to modulate and transmit the digitized voltage signal as wireless signals, wherein the piezoelectric sensing element, the SPM and the wireless module are packaged in a casing, and wherein the casing comprises a metallic shielding chamber configured to enclose the piezoelectric sensing element; and wherein the casing further comprises a non-metallic portion located in relation to the wireless module so as to allow transmission of the wireless signals.

The casing may comprise a metallic base including the metallic shielding chamber and the non-metallic portion may comprise plastic, wherein the metallic base comprises a metallic bottom and a metallic wall wrapping around the metallic bottom, and wherein the non-metallic portion and the metallic base are engageable so the wireless piezoelectric accelerometer is enclosed.

The metallic bottom may comprise a mounting portion for mounting the wireless piezoelectric accelerometer.

The piezoelectric sensing element may be a miniaturized piezoelectric micro electromechanical system (MEMS) bending-mode sensor.

The piezoelectric sensing element may be a piezoelectric shear-mode sensor.

The SPM may comprise a primary SPM and a secondary SPM, wherein the primary SPM comprises an amplifier circuit, wherein the secondary SPM comprises an analog to digital converter (ADC) and a microcontroller (MCU), wherein the MCU is programmable to control the wireless piezoelectric accelerometer, and wherein the primary SPM is enclosed in the shielding chamber.

The wireless piezoelectric accelerometer may further comprise a power supply module, wherein the wireless module and the power supply module are mounted on a print circuit board (PCB) which is immobilized within the metallic base.

The metallic base may comprise one or more groove and ridge structures on the inner brim of the metallic wall, and wherein the PCB is interlocked in the groove structure between the ridge structures.

A metal plate may be provided within the metallic base and located between the PCB and the metallic bottom so that the metal plate and portions of the metallic bottom and the metallic wall form the shielding chamber.

The shielding chamber may be placed within the metallic base in a space formed between the PCB and the metallic bottom.

The power supply module may comprise a power supply circuit and one or more batteries, wherein the power supply circuit is mounted with the wireless module on an upper side of the PCB under the plastic lid, whereas the one or more batteries are mounted on a lower side of the PCB.

The power supply module may comprise a power supply circuit and one or more batteries, wherein the power supply circuit and the one or more batteries are mounted with the wireless module on an upper side of the PCB.

The metallic base may be treated to comprise an insulation layer on its inner and external surfaces.

The shielding chamber may be electrically grounded through an inner surface of the metallic base.

The non-metallic portion may be a plastic lid.

The casing may have an overall height and a lateral width, wherein the overall height is smaller than the lateral width.

The MEMS bending-mode sensor may comprise a plurality of micro-machined silicon beams, wherein a piezoelectric thin film is coated on the plurality of micro-machined silicon beams.

The plurality of silicon beams may comprise a plurality of interdigital electrodes (IDTs) configured to provide an in-plane polarization in the piezoelectric thin film.

The MEMS bending-mode sensor may be immobilized onto the metallic bottom, wherein the plurality of micro-machined silicon beams are aligned in parallel with a main surface plane of the metallic bottom, such that the wireless piezoelectric accelerometer is configured to detect an acceleration in the direction perpendicular to the main surface plane of the metallic bottom.

The MEMS bending-mode sensor and the amplifier circuit may be fabricated on a common silicon wafer.

The MEMS bending-mode sensor and the amplifier circuit may be fabricated on different silicon wafers and joined together through a bonding process.

The piezoelectric shear-mode sensor may comprise a piezoelectric single crystal plate, wherein the piezoelectric shear-mode sensor is configured to convert a shear strain of the piezoelectric single crystal plate induced by an acceleration to an electric charge signal.

The metallic bottom may comprise a central post protruding inwards vertically, wherein the piezoelectric shear-mode sensor is mounted on a wall of the central post.

The piezoelectric single crystal plate may be a piezoelectric lead magnesium niobate-lead titanate (PMN-PT) single crystal plate or a piezoelectric lead zinc niobate-lead titanate (PZN-PT) single crystal plate with a perovskite crystal structure, wherein a polarization direction of the piezoelectric single crystal plate is aligned with an axis direction of the central post, such that the wireless piezoelectric accelerometer is configured to detect the acceleration in a direction parallel with the central post.

Also disclosed herein is a wireless piezoelectric accelerometer system, comprising:

a wireless piezoelectric accelerometer comprising:

a piezoelectric sensing element configured to sense mechanical acceleration and produce an electrical charge signal in response of the sensed mechanical acceleration;

a signal processing module (SPM) configured to convert the electrical charge signal into a voltage signal, and process and digitize the voltage signal; and a wireless module configured to modulate and transmit the digitized voltage signal as wireless signals, wherein the piezoelectric sensing element, the SPM and the wireless module are packaged in a casing, and wherein the casing comprises a metallic shielding chamber configured to enclose the piezoelectric sensing element; and wherein the casing further comprises a non-metallic portion located in relative to the wireless module to allow transmission of the wireless signals;

a base unit; and a signal analyzing device, wherein the wireless piezoelectric accelerometer and the base unit are connected via a wireless link, and wherein the base unit and the signal analyzing device are connected via an interface.

The interface may comprise an universal serial bus (USB).

The base unit may be configured to control the wireless piezoelectric accelerometer to operate in a sleep mode and a wake mode.

The wireless piezoelectric accelerometer may further comprise one or more repeater units between the wireless piezoelectric accelerometer and the base unit so as to extend a communication range between the wireless piezoelectric accelerometer and the base unit.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 1

FIGS. 2A-2B

FIG. 3

FIG. 4

FIG. 5

FIG. 6

FIGS. 7A-7B

FIG. 8

FIG. 9

FIG. 10

FIG. 11

FIG. 12

FIG. 13

FIG. 14

FIG. 15

FIG. 16

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description. Herein, a miniaturized piezoelectric accelerometer that is configured to transmit wireless communication and a system able to operate the wireless accelerometer in a relatively extended range thereof are discussed as follows.

Figure 1:
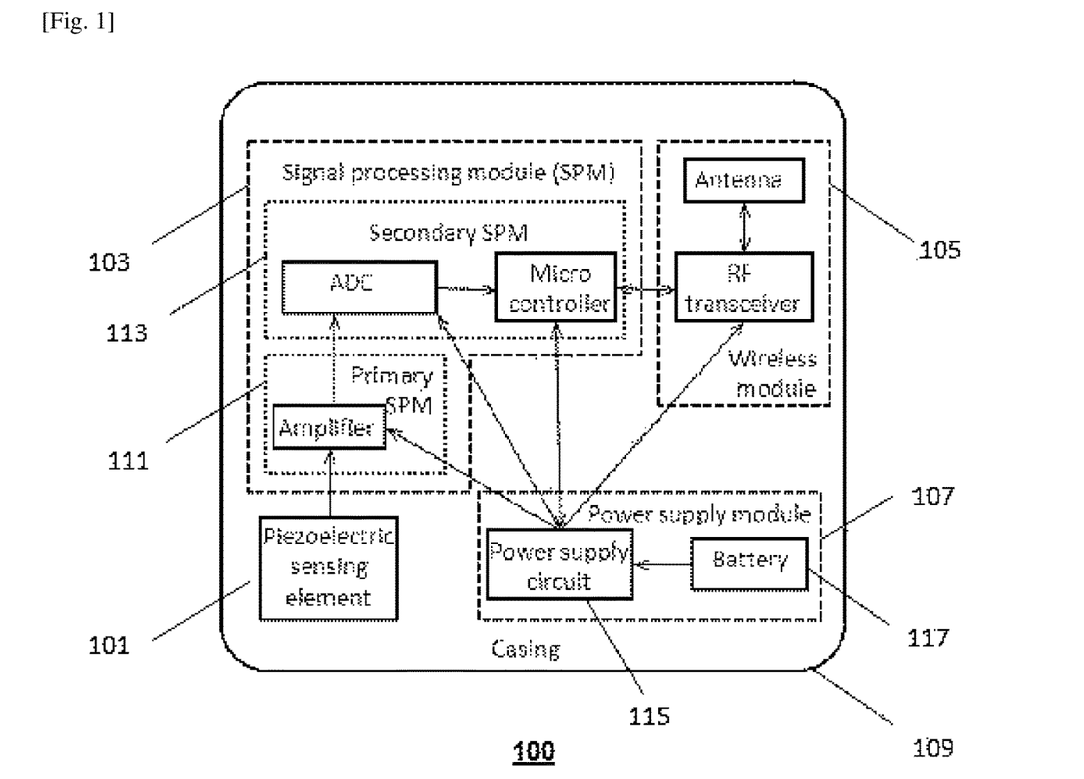
FIG. 1 depicts a logic diagram of a wireless piezoelectric accelerometer in accordance with a present embodiment.

Referring to FIG. 1, a logic diagram 100 of the wireless piezoelectric accelerometer in accordance with the present embodiment is shown. The wireless piezoelectric accelerometer 100 comprises a plurality of components, including a piezoelectric sensing element 101, a signal processing module (SPM) 103 and a wireless module 105. The SPM comprises a primary SPM 111 and a secondary SPM 113, wherein the primary SPM 111 comprises an amplifier circuit and the secondary SPM 113 comprises an analog to digital converter (ADC) and a programmable microcontroller (MCU). The amplifier circuit 111 comprises a charge amplifier and an attenuator, and is configured to convert a physical motion signal, e.g. a vibration signal, sensed by the piezoelectric sensing element 101 to an analog signal suitable for input to the ADC. The ADC converts the analog signal from the amplifier circuit 111 to a digital signal for input to the MCU. The MCU controls the operation of the wireless piezoelectric accelerometer 100. The wireless module 105 comprises a RF transceiver and an antenna for transmission and/or reception of wireless RF signals. The wireless piezoelectric accelerometer 100 may further comprise a power supply module 107 for powering the wireless piezoelectric accelerometer 100. The power supply module 107 comprises a power supply circuit 115 and one or more batteries 117.

All the plurality of components of the wireless piezoelectric accelerometer 100 are packaged in one casing 109. The casing 109 provides mechanical support and protection for the plurality of components.

Figure 2A:
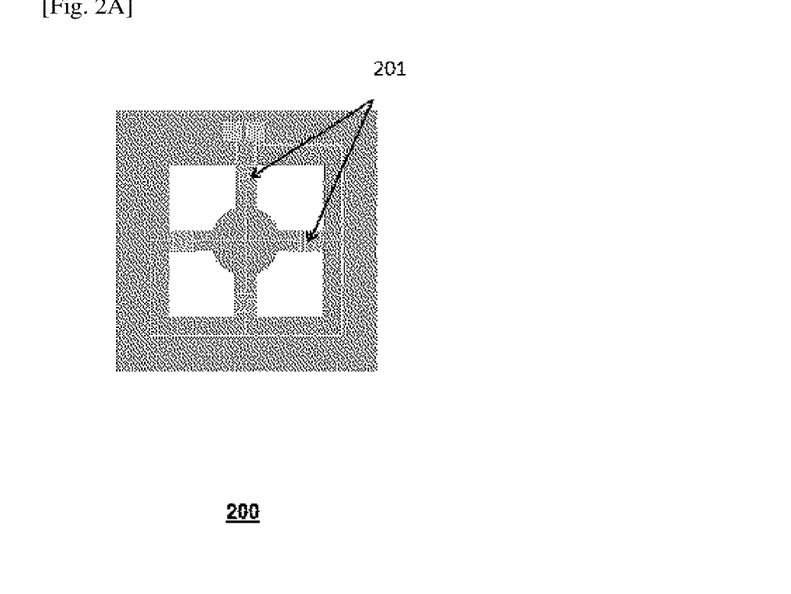
FIG. 2A depicts a top view of a piezoelectric micro electromechanical system (MEMS) bending-mode sensing element of the wireless piezoelectric accelerometer of FIG. 1.
Figure 2B:
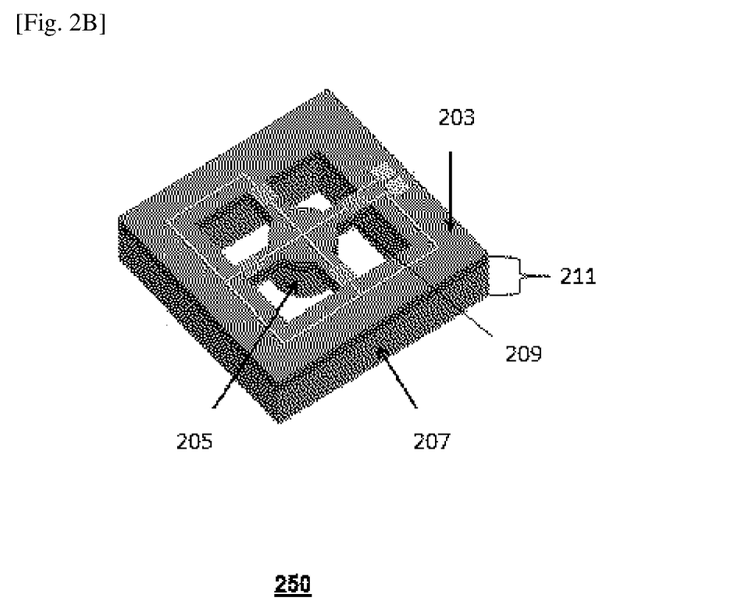
FIG. 2B depicts a perspective top front side view of the embodiment of the miniaturized piezoelectric MEMS bending-mode sensor of FIG. 2A.

In an embodiment, the piezoelectric sensing element 101 is a piezoelectric micro electromechanical system (MEMS) bending-mode sensing element, which is a piezoelectric thin film-based bending-mode micro sensor fabricated by a micro machining process that has been used to produce micro electromechanical system (MEMS). FIGS. 2A-2B show structures of the piezoelectric MEMS bending-mode sensing element 200. As shown in FIGS. 2A-2B, the piezoelectric MEMS bending-mode sensor 200 has a plurality of micro-machined piezoelectric thin-film beams 209 connected to one common seismic mass structure 205. In particular, the piezoelectric MEMS bending-mode sensor 200 comprises four supporting beams 209 clamped on a silicon frame 211. The supporting beams 209 can be a plurality of silicon beams. The common seismic mass structure 205 of a cylindrical configuration and made of silicon is located at the centre of the four supporting beams 209. A piezoelectric thin film 203 is coated on the beams 209 with a plurality of interdigital electrodes (IDTs) 201 deposited near the clamped ends of the beams. The plurality of IDTs 201 on all the four beams 209 are electrically connected in parallel. The piezoelectric MEMS bending-mode sensing element 200 utilizes the plurality of IDTs 201 to realize an in-plane polarization in the sensing piezoelectric thin film 203. The piezoelectric thin film 203 can be made of a ferroelectric material, such as lead zirconium titanate doped with lanthanum (PLZT). The silicon frame 211 comprises a silicon-on-isolator (SOI) substrate 211. As described above, the piezoelectric thin film 203 is deposited on the silicon-on-isolator (SOI) substrate 211 by a chemical solution approach. The SOI wafer 211 is patterned and etched on a silicon substrate 207 to form the seismic mass 205. An acceleration of the machine or structure to which the wireless piezoelectric accelerometer 100 is attached induces a movement of the seismic mass 205. The seismic mass movement strains the supporting beams 209, and the strain of the beams is sensed and converted to an electrical charge signal due to the piezoelectric effect. The electrical charge signal proportional to the acceleration is detected through the IDTs 201.

The wireless piezoelectric accelerometer 100 using the piezoelectric MEMS bending-mode sensor 200 in accordance with the present embodiment achieves a size that is more compact than those known piezoelectric accelerometers. To further reduce the size of the wireless piezoelectric accelerometer 100, the amplifier circuit 111 and the piezoelectric MEMS bending-mode sensing element 200 can be fabricated on a same silicon or SOI wafer 211. Thus, the piezoelectric MEMS bending-mode sensing element 200 and the amplifier circuit 111, i.e. the primary SPM 111 as shown in FIG. 1, will form a monolithic integration. Alternately, the amplifier circuit 111 and the piezoelectric MEMS bending-mode sensing element 200 can be fabricated on different silicon or SOI wafers, and these wafers can be bonded together through an established bonding/wafer-bonding process to form the integration or the joining together of the piezoelectric MEMS bending-mode sensor 200 (hereinafter referred to as "MEMS bending-mode sensor") and the primary SPM 111.

Figure 3:
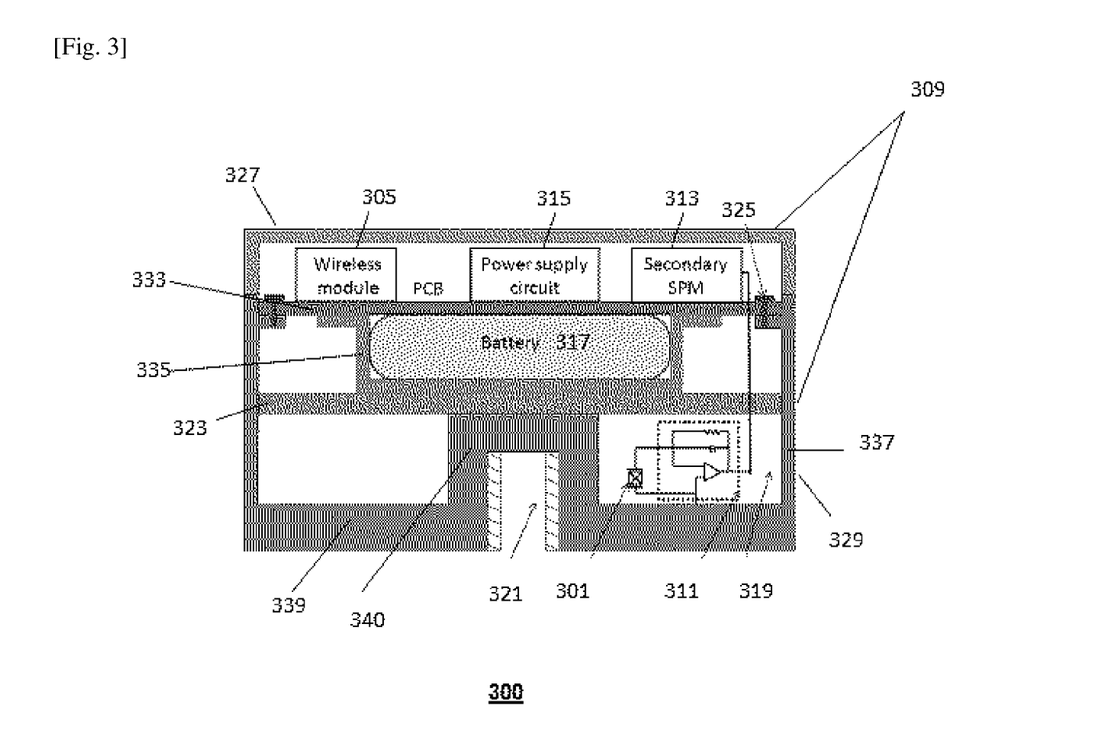
FIG. 3 depicts a side view of a configuration of a first embodiment of the wireless piezoelectric accelerometer using the MEMS bending-mode sensor in accordance with FIG. 2A.

To achieve a minimized size and weight of the wireless piezoelectric accelerometer 100, the configuration of all the plurality of components of the wireless piezoelectric accelerometer 100 in the casing 109 need to be carefully designed. FIG. 3 shows a configuration of the embodiment of the wireless piezoelectric accelerometer 300 using the MEMS bending-mode sensor of FIGS. 2A-2B. As illustrated in FIG. 1, all the plurality of components of the wireless piezoelectric accelerometer 300 are packaged in one casing 309. The casing 309 contains one or more mounting portions 321 for mounting the wireless piezoelectric accelerometer 300. The mounting portions 321 can be a stud mounting hole for ease of mounting the wireless piezoelectric accelerometer 300 on a machine or structure to be monitored. The casing 309 comprises a metallic portion and a non-metallic portion. In the present embodiment, the metallic portion comprises a metallic base 329, while the non-metallic portion comprises plastic. As shown in FIG. 3, the non-metallic portion comprises a plastic lid 327 engageable with the metallic base to enclose the wireless piezoelectric accelerometer 300.

As shown in FIG. 3, the metallic base 329 comprises a metallic bottom 339 and a metallic wall 337 wrapping around the metallic bottom 339. In the present embodiment shown in FIG. 3, the metallic bottom 339 is thick and flat, and comprises a thick central post 340 formed protruding inwards vertically thereof, that is, protruding in a direction perpendicular to a main surface plane of the bottom 339. A blind hole 321 is threaded in the central post 340 for the stud mounting to serve as the mounting portion 321. The MEMS bending-mode sensor 301 is immobilized on an inner surface of the metallic bottom 339, wherein the bending beams 209 of the MEMS bending-mode sensor 301 coated with the piezoelectric thin film 203 are aligned in parallel with the main surface plane of the metallic bottom 339. The MEMS bending-mode sensor 301 can be immobilized onto the metallic bottom 339 via bonding by adhesives, such as epoxy. In the present embodiment, the wireless piezoelectric accelerometer 300 is bonded with adhesive on the main surface plane of the metallic bottom 339 therefore is configured to detect the acceleration in the direction perpendicular to the main surface plane of the metallic bottom 339. The secondary SPM 313, the power supply module 107, and the wireless module 305 can be implemented using single integrated circuits (IC) and radio modules that are commercially available. The wireless piezoelectric accelerometer 300 in accordance with the present embodiment requires the power supply module 107 with two output voltages, therefore two button batteries 317 are adopted in the present embodiment for step-up and step-down conversion. To maximize the efficiency for the step-down conversion of the battery voltage of the power supply module 107, switching regulators are used in the present embodiment.

As illustrated in the present embodiment shown in FIG. 3, all the plurality of components of the wireless piezoelectric accelerometer 300 except the MEMS bending-mode sensor 301 and the charge amplifier circuit 311 are mounted on one printed circuit board (PCB) 333. The PCB 333 bears the secondary SPM 313 and the wireless module 305 on an upper/front side and one or more batteries 317 on a lower/back side. A retainer 335 is welded on the lower side of the PCB 333 to hold the one or more batteries 317, wherein the one or more batteries 317 are exchangeable once out of charge. The PCB 333 is fixed on the casing 309. The fixing of the PCB 333 with the casing 309 can be realized by screws 325 on an intersectional portion. Alternatively, the PCB 333 can be fixed on the casing 309 by having an interlocking groove and ridge structure that form a tight seal when pressed together on the casing 309. The interlocking groove and ridge structure will be described in the following description with respect to the other embodiments.

The piezoelectric micro MEMS bending-mode sensor 301 is a capacitive device which is susceptible to the electromagnetic interference (EMI). The output impedance of the equivalent circuit of the piezoelectric micro MEMS bending-mode sensor 301 is very high, so that in the present embodiment the charge signal is converted to a voltage signal by the amplifier circuit 311. As described above, the voltage signal is digitalized and filtered by the secondary SPM 313 and transmitted by the wireless module 305. The charge signal before the amplifier conversion is highly susceptible to the EMI, thus the wires connecting the sensing element and the charge amplifier need to be minimized to reduce the EMI coupling. Accordingly, screening measure is taken in the casing 309 of the present embodiment so that the sensing element, i.e. the piezoelectric micro MEMS bending-mode sensor 301 and the charge amplifier, i.e. the amplifier circuit 311 are effectively shielded from the EMI.

In conventional wired accelerometer designs, the EMI problem is solved by adopting an all-metallic casing which encloses all the sensing element and signal processing circuits including the charge amplifier. A cable is used to lead the sensed signal out of the casing to reach a signal analyzer. However, as wireless piezoelectric accelerometers are used in the present embodiments, the communication of the wireless piezoelectric accelerometers is via RF signal without wire connection. Therefore, a non-metallic window for the RF communication is needed to be included on the casing 309. As described above, the casing 309 includes both metallic and plastic parts in the present embodiments.

The packaging and mounting structures of the casing 309 of the wireless piezoelectric accelerometer 300 induce additional resonances, which affect an overall frequency response of the wireless piezoelectric accelerometer 309. As the lowest resonance of the whole structure determines the maximum applicable frequency of the wireless piezoelectric accelerometer 300, the casing 309 is desired to be compact and light in weight so that the vibration of the machine or structure under monitoring is not disturbed by the attached wireless piezoelectric accelerometer 300.

To realize the above mentioned desired casing, the present casing 309 comprises a metallic base 329 as a lower part and a plastic lid 327 as an upper part, as described above. An overall height of the packaged wireless piezoelectric accelerometer 300 is smaller than the width. The metallic base is made of mild steel. Other metals such as stainless steel, titanium, magnesium and aluminum, or alloy of the above-mentioned metals can also be used. The mild steel has the permeability of approximately 450 at 1 kHz and has a better magnetic shielding effect than many other metal materials. Therefore, the metallic base 329 made of the mild steel can effectively block the magnetic field at a low frequency range, which is a main concern in the accelerometer design because the working frequency of the wireless piezoelectric accelerometer is typically below 20 kHz.

For better EMI shielding purposes, a metallic shielding chamber is provided in the present embodiment to enclose the piezoelectric sensing element. As shown in FIG. 3, a metal plate 323 is placed within the metallic base 329 and located between the PCB 333 and the metallic bottom 339. In the present embodiment, the metal plate 323 is placed on the central post 340 with its outline fitted with the metallic walls 337 of the metallic base 329. The metal plate 323 and the metallic base 329 form an enclosed shielding chamber 319 within which the piezoelectric micro MEMS bending-mode sensor 301 and the charge amplifier circuit 311 are screened. To effectively block the low frequency magnetic field, the metal plate 323 can be made of metals having a high permeability, such as nickel, mild steel, or mumetal. The metal plate 323 can also be made of normal metals, with one side glued with a high permeability metal foil. Metals of higher permeability usually have a smaller conductivity, which is disadvantageous for electric field shielding. Therefore, the metal plate 323 is also needed to have a high conductivity. In view of the above, a high conductive metal plate combined with a high permeability foil can effectively shield both the electric field and the magnetic field at the same time. In the present embodiment, the metal plate 323 and the metallic base 329 are sealed by electrically conductive adhesive. Further, the metal plate 323 and the metallic base 329 are short circuited to keep the same potential. In the present embodiment, the electric connection of the metal plate 323 and the metallic base 329 is done by scratching one strip of the insulation layer on the inner surface of the metal casing made of mild steel at the location where the metal plate is sealed. The electric connection is formed because the sealing adhesive used is conductive silver.

The voltage signal after charge amplifier conversion is led out of the shielding chamber 319 by one or more wires connected to the secondary SPM. The wire penetrates the metal plate 323 through a hole drilled on the metal plate 323 or a jointing boundary between the metal plate 323 and the metallic base 329.

In the present embodiment, the plastic lid 327 is made of delrin or acrylic plastics. The plastic lid is transparent to the RF signal and is glued on the metallic base 329 in the present embodiment.

Figure 4:
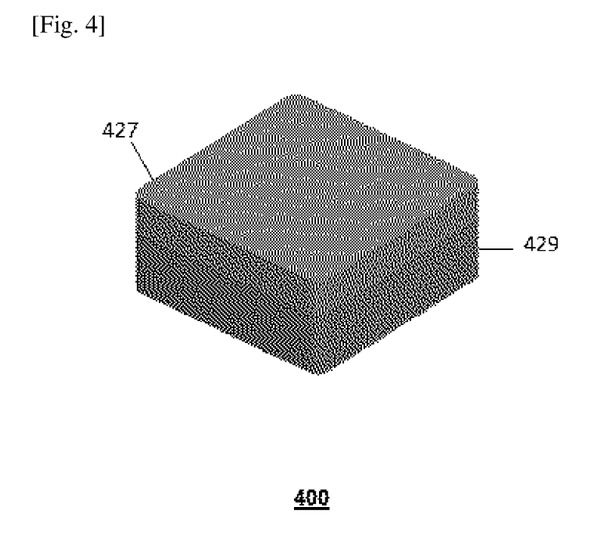
FIG. 4 depicts a top front side view of the configuration of the first embodiment of the wireless piezoelectric accelerometer.

Referring to FIG. 4, a top front side view 400 of the configuration of the wireless piezoelectric accelerometer of FIG. 3 is illustrated. In FIG. 4, the plastic lid 427 and the metallic base 429 of the casing 309 are depicted. In accordance with FIG. 4, the wireless piezoelectric accelerometer of FIG. 3 is in a rectangle configuration. Therefore, the intersectional portion as described above can be at four corners of the PCB 333.

Figure 5:
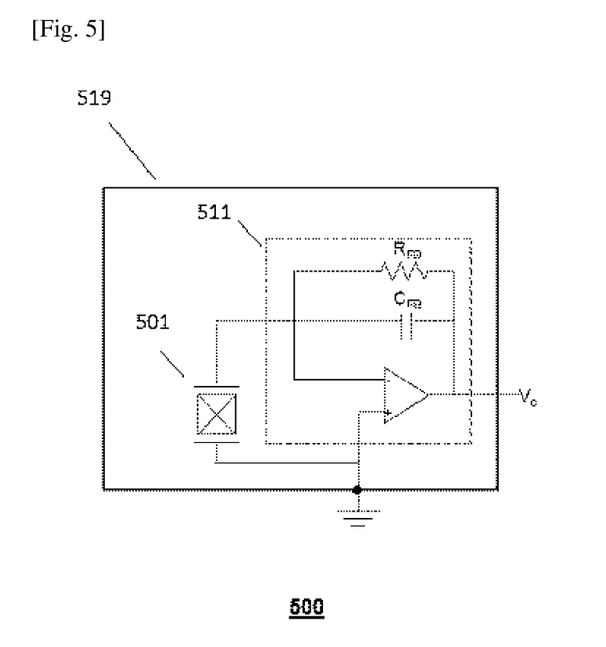
FIG. 5 depicts an embodiment of an electrically grounded shielding chamber.

Referring to FIG. 5, an embodiment of an electrically grounded shielding chamber is depicted. The wireless piezoelectric accelerometer 300 is often mounted on a metallic machine. Direct electrical connection between the wireless piezoelectric accelerometer 300 and the machine may cause a ground loop effect which introduces noise in the sensed signal. In the present embodiment, some measures are adopted to reduce the ground loop effect. Firstly, the metallic base 329 is surface treated to have an insulation surface layer. The insulation layer has a function of electrically isolating the piezoelectric micro MEMS bending-mode sensor 301 from the machine. The surface insulation blocks electrical connection between the circuit ground and the machine, which can eliminate the ground loop effect. The surface insulation treatment can be realized by an established processes in industry, such as phosphating. The surface insulation treatment can also be realized by surface coating, such as through thermal spray. Secondly, the metallic base 329 is grounded to avoid the ground loop effect. The grounding of the metallic base 329 is realized by an electrically grounded shielding chamber as shown in FIG. 5. In the grounding embodiment shown in FIG. 5, an electrode of the piezoelectric micro MEMS bending-mode sensor 501 and the ground of the charge amplifier circuit 511 are connected together with the metallic base 329 of the casing 309. One strip of the coated insulation layer at a bottom of the shielding chamber 519 is scratched and the ground of the charge amplifier circuit 511 is connected with the casing 309 through the exposed metallic base 329.

Figure 6:
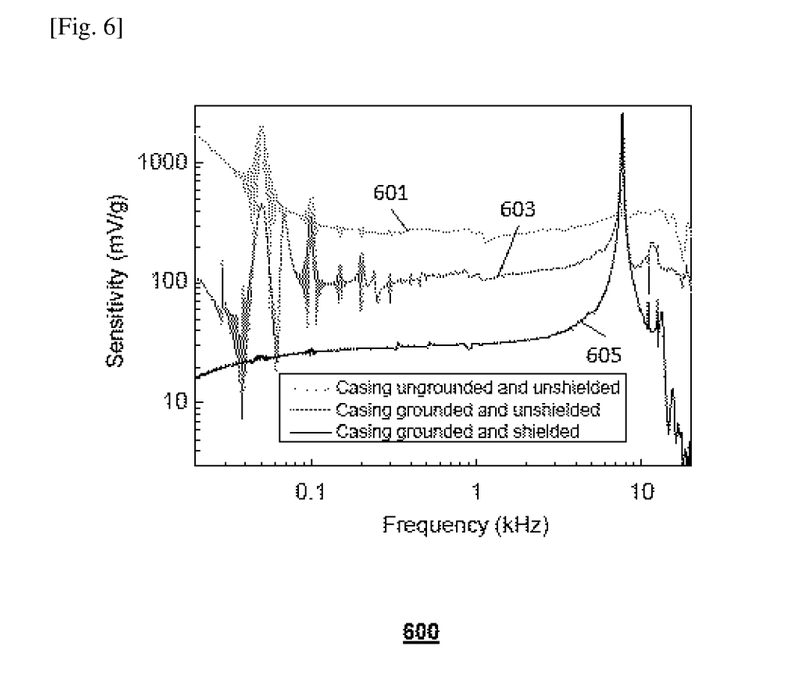
FIG. 6 depicts a waveform diagram showing a frequency domain response of the embodiment of the miniaturized piezoelectric MEMS bending-mode sensor under different grounding and shielding conditions.

FIG. 6 presents the sensitivity frequency spectra tested on a wireless piezoelectric accelerometer employing a piezoelectric micro MEMS bending-mode sensor 301, with a comparison among the different grounding and shielding conditions. In FIG. 6, waveform 601 and waveform 603 represent a sensitivity spectra measured in an unshielded condition when the metal plate 323 is not provided in the casing 309. In particular, waveform 601 represents the sensitivity spectrum measured in the unshielded condition and with the casing 309 ungrounded, while waveform 603 represents the sensitivity spectrum measured in the unshielded condition but with the casing 309 grounded. Waveform 605 represents a sensitivity spectrum measured in a shielded condition when the metal plate 323 is placed in the casing 309 to form an enclosed shielding chamber 319 with the metallic base 329. As described above, FIG. 6 compares the sensitivity spectra before and after casing grounding treatment in waveforms 601 and 603. From the comparison, the casing grounding configuration eliminates noises especially those at low frequency, but it does not eliminate the 50 Hz multiple main noise. From a comparison between waveform 603 and waveform 605, it is proved that the shielding chamber 319 further effectively eliminated the low frequency noise. As shown in waveform 605, the sensitivity curve becomes smooth after introduction of the shielding chamber. The resonance at 7.7 kHz agrees with the numerical simulation results shown in waveforms 601, 603 and 605 conducted for the piezoelectric micro MEMS bending-mode sensor 301. The casing configuration as shown in FIG. 3 is proven to not introduce any resonance lower than the fundamental resonance of the piezoelectric micro MEMS bending-mode sensor 301, which secures a maximum utilization of the dynamic frequency range provided by the piezoelectric micro MEMS bending-mode sensor 301. As shown in FIG. 6, after noise suppression, the experimentally measured charge sensitivity at 1 kHz is 31.2 mV/g.

Figure 7A:
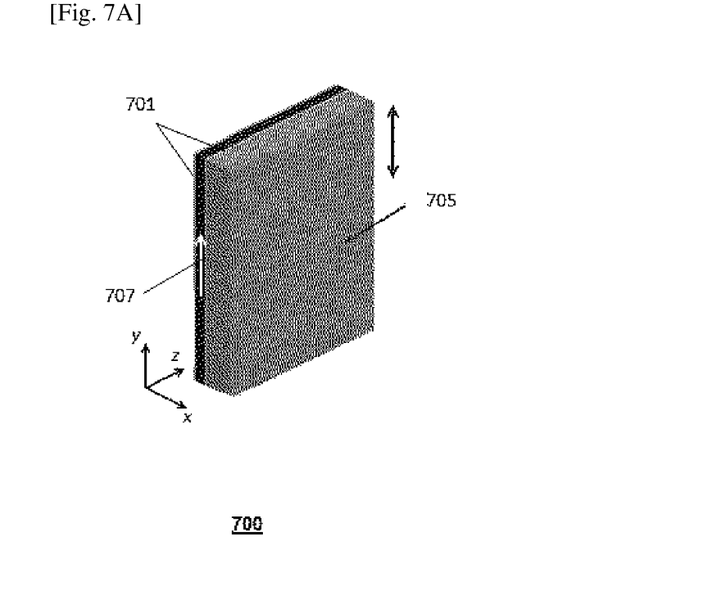
FIG. 7A depicts a perspective view of another embodiment of a piezoelectric sensing element of the wireless piezoelectric accelerometer, wherein piezoelectric sensing element is a piezoelectric shear-mode sensor.
Figure 7B:
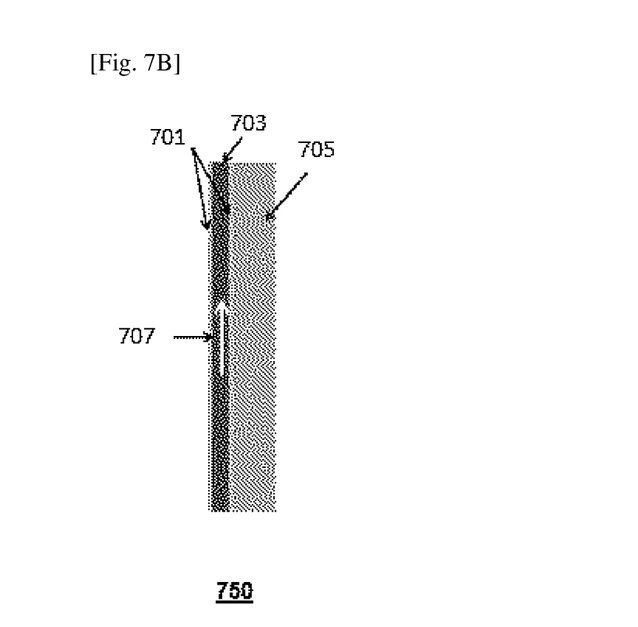
FIG. 7B depicts a side view of the embodiment of the piezoelectric shear-mode sensor of FIG. 7A.

In another embodiment, the piezoelectric sensing element 101 is a piezoelectric shear-mode sensor 700. FIGS. 7A and 7B depict the embodiment where the piezoelectric shear-mode sensor made of a piece of piezoelectric single crystal plate 703. The piezoelectric single crystal plate 703 is a piezoelectric lead magnesium niobate-lead titanate (PMN-PT) single crystal plate or a piezoelectric lead zinc niobate-lead titanate (PZN-PT) single crystal plate or any other ferroelectric relaxor single crystal plate with a perovskite crystal structure and high shear-mode piezoelectric coefficient. The piezoelectric crystal plate 703 has a dimension of 5 mm×3 mm×0.2 mm, and has a pair of electrodes 701. A brass proof mass 705 of 5 mm×3 mm×0.5 mm is bonded to the electroded piezoelectric plate 703, as illustrated in FIG. 7B. The polarization of the piezoelectric single crystal plate is in a direction 707 along the longer side of the plate 703. The direction 707 as shown in FIGS. 7A and 7B is an optimal direction for the piezoelectric single crystal plate 703 to achieve the largest piezoelectric shear coefficient. A $d_{15}$ shear-mode effect is used to convert a shear strain generated by the acceleration in the polarization direction 707 to an electric output, i.e. an electric charge signal.

Figure 8:
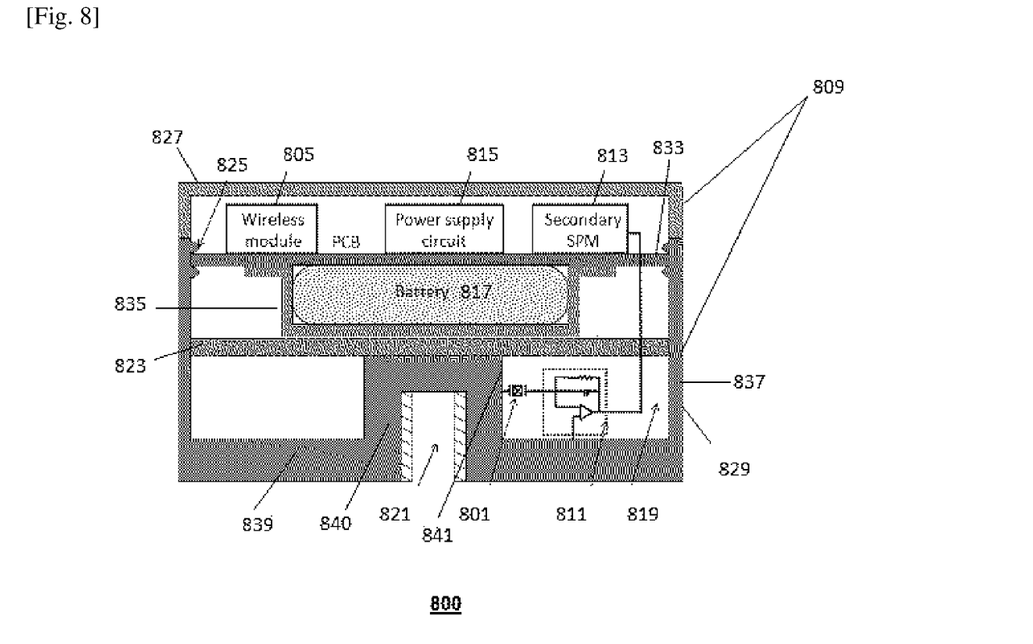
FIG. 8 depicts a side cross-sectional view of a configuration of a second embodiment of a wireless piezoelectric accelerometer, wherein the piezoelectric shear-mode sensor is used as the piezoelectric sensing element.

Referring to FIG. 8, a configuration of the embodiment 800 of the wireless piezoelectric accelerometer using the piezoelectric shear-mode sensor 700 is depicted.

As shown in FIG. 8, similar to the configuration of the embodiment as shown in FIG. 3, all the plurality of components of the wireless piezoelectric accelerometer 800 are also packaged in one casing 809. The casing 809 contains one or more mounting portions 821 for mounting the wireless piezoelectric accelerometer 800. The mounting portions 821 can be a stud mounting hole for ease of mounting the wireless piezoelectric accelerometer 800 on a machine or structure to be monitored. The casing 809 comprises a metallic portion and a non-metallic portion. In the present embodiment, the metallic portion comprises a metallic base 829, while the non-metallic portion comprises plastic. As shown in FIG. 8, the non-metallic portion comprises a plastic lid 827 engageable with the metallic base 829 to enclose the wireless piezoelectric accelerometer 800.

As shown in FIG. 8, the metallic base 829 comprises a metallic bottom 839 and a metallic wall 837 wrapping around the metallic bottom 839. In the present embodiment shown in FIG. 8, the metallic bottom 839 is thick and flat, and comprises a thick central post 840 formed protruding inwards vertically thereof, that is, protruding in a direction perpendicular to a main surface plane of the bottom 839. A blind hole 821 is threaded in the central post 840 for the stud mounting to serve as the mounting portion 821.

As shown in FIG. 8, a piezoelectric shear-mode sensing element 801 is mounted on a wall 841 of the central post 840 of the wireless piezoelectric accelerometer 800, in which the crystal direction y of the perovskite structure 700 is aligned with an axis direction of the central post 840. Thus the wireless piezoelectric accelerometer 800 detects the acceleration in the direction parallel with the central post 840, i.e. perpendicular to the main surface plane of the bottom 839.

Similar to the wireless piezoelectric accelerometer shown in FIG. 3, the plurality of components of the wireless piezoelectric accelerometer 800 except the piezoelectric shear-mode sensing element 801 and the charge amplifier circuit 811 are mounted on one printed circuit board (PCB) 833. The PCB 833 bears the secondary SPM 813 and the wireless module 805 on an upper/front side and one or more batteries 817 on a lower/back side. A retainer 835 is welded on the lower side of the PCB 833 to hold the one or more batteries 817, wherein the one or more batteries 817 are exchangeable once out of charge. The PCB 833 is fixed on the casing 809. In the present embodiment, the fixing of the PCB 833 with the casing 809 is realized by one or more groove and ridge structures on the inner brim of the metallic wall 837, wherein the PCB 833 is interlocked in the groove structure between the ridge structures.

As shown in FIG. 8, a metallic shielding chamber 819 is provided in the present embodiment to enclose the piezoelectric sensing element 801. As shown in FIG. 8, a metal plate 823 is placed within the metallic base 829 and located between the PCB 833 and the metallic bottom 839. In the present embodiment, the metal plate 823 is placed on the central post 840 with its outline fitted with the metallic walls 837 of the metallic base 829. The metal plate 823 and the metallic base 829 form an enclosed shielding chamber 819 within which the piezoelectric shear-mode sensor 801 and the charge amplifier circuit 811 are screened.

Similar to the embodiment as shown in FIG. 3, the metallic base 829 can be surface treated to have an insulation surface layer. In the present embodiment as shown in FIG. 8, a part of the insulation layer on the wall 841 of the central post 840 is removed and one electrode 701 of the piezoelectric shear-mode sensor 801 is adhesively mounted on the wall 841. The electric connection between the piezoelectric shear-mode sensor 801 and the central post 840 of the casing 809 is realized by adopting a conductive adhesive, such as a conductive epoxy. The other electrode 701 of the piezoelectric shear-mode sensor 801 is connected with an input of the charge amplifier circuit 811. To simplify the changing of one or more batteries 817, the PCB 833 is not screw fixed on the casing 809 but by an interlocking groove and ridge structure as described above that form a tight fit when pressed together, designed on the inner brim of the metallic base 829. An overall height of the packaged accelerometer 800 is smaller than the width.

Figure 9:
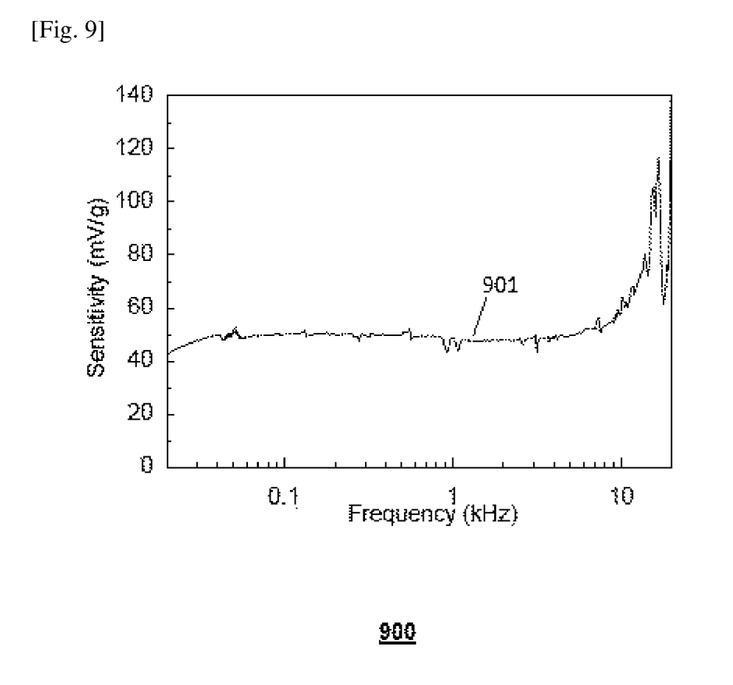
FIG. 9 depicts a waveform diagram showing a sensitivity spectrum of the second embodiment of the wireless piezoelectric accelerometer using the piezoelectric shear-mode sensor.

FIG. 9 shows a waveform 901 that presents a sensitivity spectrum of the wireless piezoelectric shear-mode accelerometer 800 from 20 Hz to 20 kHz. In FIG. 9, the piezoelectric shear-mode accelerometer 800 shows a resonance at 16.5 kHz due to the casing package structure 809. This is not from the intrinsic resonance of the shear-mode sensing element 801 which is much higher. In FIG. 9, the sensitivity at 1 kHz of the piezoelectric shear-mode accelerometer is 48.8 mV/g.

Figure 10:
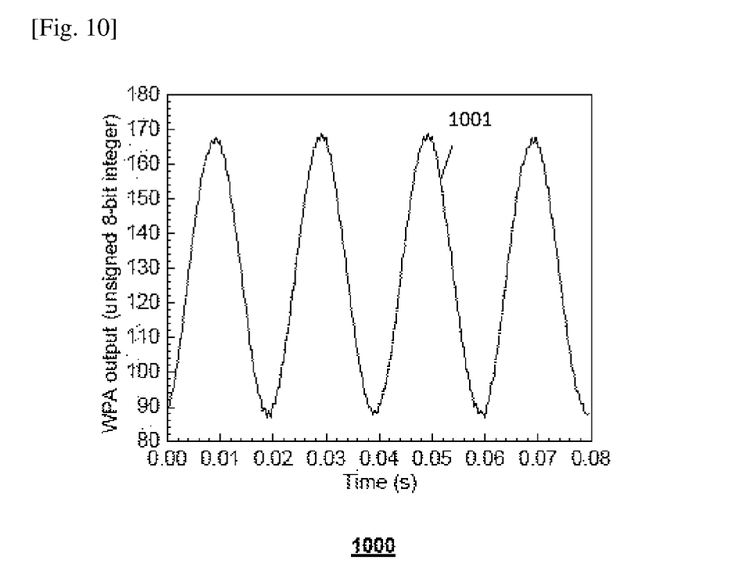
FIG. 10 depicts a waveform diagram showing an output waveform of the second embodiment of the wireless piezoelectric accelerometer using the piezoelectric shear-mode sensor sensitivity in response to a vibration of 10 g at 50 Hz.

FIG. 10 shows a waveform 1001 that presents an output in time domain of the wireless piezoelectric shear-mode accelerometer 800 in responses to a vibration of 10 g at 50 Hz.

Figure 11:
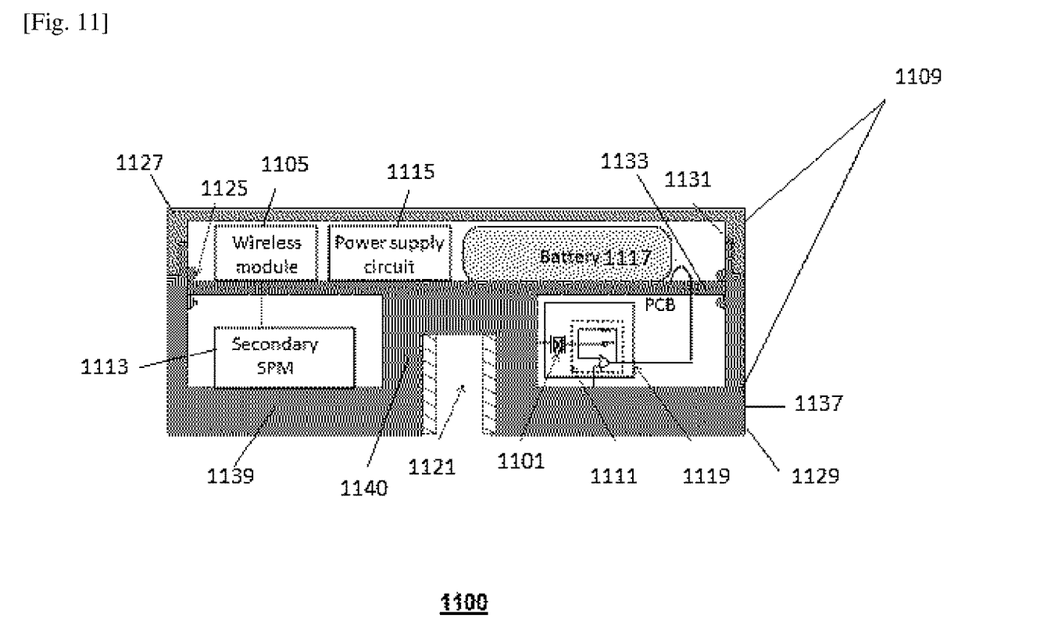
FIG. 11 depicts a side cross-sectional view of a configuration of a third embodiment of a wireless piezoelectric accelerometer, wherein the piezoelectric sensing element is a piezoelectric shear-mode sensor.

For the ease of changing the one or more batteries and to achieve a more compact package, the one or more batteries can be mounted on an upper/top surface of the PCB. FIG. 11 depicts a configuration of a further embodiment 1100 of the wireless piezoelectric accelerometer using the piezoelectric shear-mode sensor as described in FIG. 8, wherein the one or more batteries are mounted on the upper surface of a PCB 1133. In the present embodiment, the PCB 1133 is immobilized to the casing 1109 by an interlocking groove and ridge structure 1125 as described above.

Similar to the embodiments described above, all the plurality of components of the wireless piezoelectric accelerometer 1100 are packaged in one casing 1109. The casing 1109 contains one or more mounting portions 1121 for mounting the wireless piezoelectric accelerometer 1100. The mounting portions 1121 can be a stud mounting hole for ease of mounting the wireless piezoelectric accelerometer 1100 on a machine or structure to be monitored. The casing 1109 comprises a metallic portion and a non-metallic portion. In the present embodiment, the metallic portion comprises a metallic base 1129, while the non-metallic portion comprises plastic. As shown in FIG. 3, the non-metallic portion comprises a plastic lid 1127 engageable with the metallic base to enclose the wireless piezoelectric accelerometer 1100.

As shown in FIG. 11, the metallic base 1129 comprises a metallic bottom 1139 and a metallic wall 1137 wrapping around the metallic bottom 1139. In the present embodiment shown in FIG. 11, the metallic bottom 1139 is thick and flat, and comprises a thick central post 1140 formed protruding inwards vertically thereof, that is, protruding in a direction perpendicular to a main surface plane of the metallic bottom 1139. A blind hole 1121 is threaded in the central post 1140 for stud mounting to serve as the mounting portion 1121. In the embodiment shown in FIG. 11, the casing 1109 and a plastic lid 1127 is assembled with screw. Screw threads 1131 are tapped on the outer brim of the metallic base 1129 and the inner brim of the plastic lid 1127. To further reduce the size of the wireless piezoelectric accelerometer 1100, a space around the central post 1140 is utilized to accommodate the secondary SPM 1113.

In the present embodiment shown in FIG. 11, the sensing element 1101 and the charge amplifier circuit 1111 are put inside a separate small shielding chamber 1119 made of a metallic material to achieve the electromagnetic shielding purpose. Wires are led out of the shielding chamber 1119 and connected with the PCB 1133. An overall height of the packaged accelerometer 1100 is smaller than its diameter.

Figure 12:
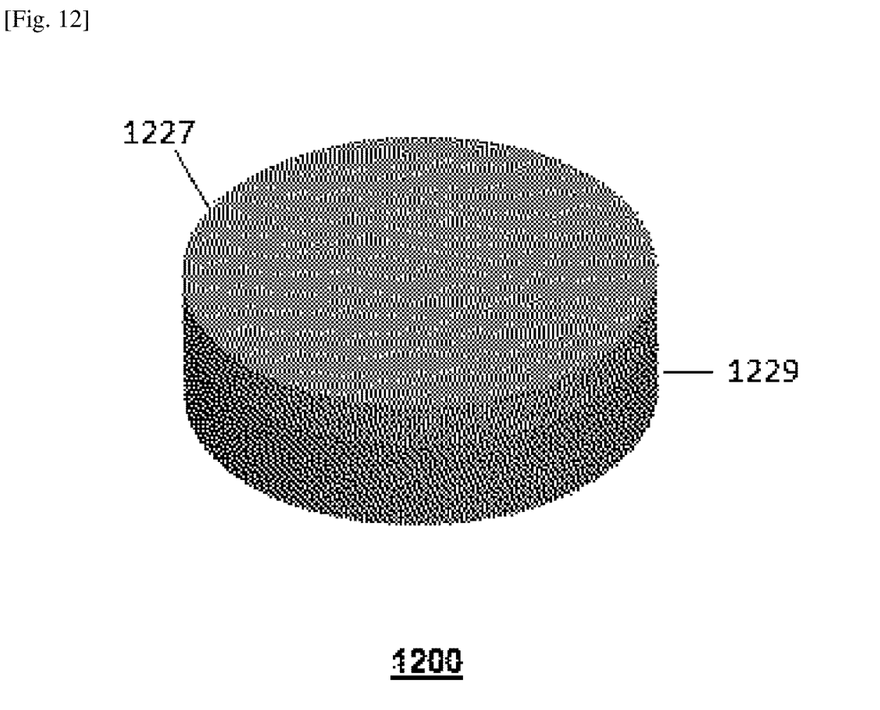
FIG. 12 depicts a top front view of a circular configuration of the third embodiment of the wireless piezoelectric accelerometer.

FIG. 12 shows that the casing 1109 of the present embodiment shown in FIG. 11 has a circular shape.

Figure 13:
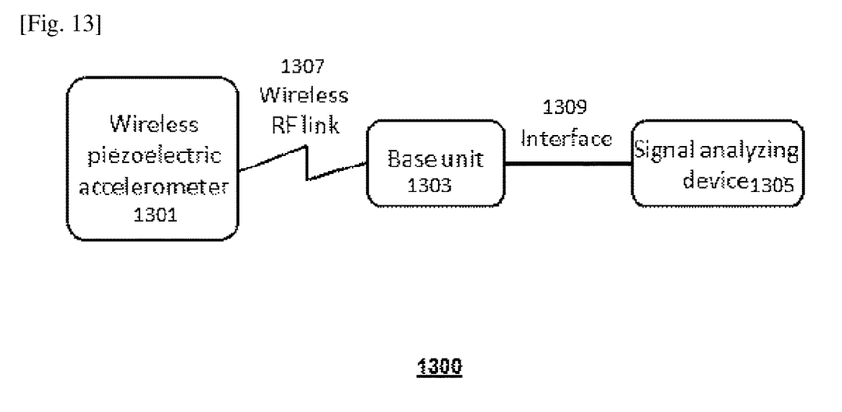
FIG. 13 depicts a diagram of an embodiment of a wireless piezoelectric accelerometer system in accordance with the present embodiment.

Referring to FIG. 13, a schematic diagram 1300 for an embodiment of a wireless piezoelectric accelerometer system is shown. The system 1300 comprises a wireless piezoelectric accelerometer 1301 in accordance with the embodiments described above which is wirelessly linked 1307 to a base unit 1303 through radio frequency (RF) communication. The base unit 1303 is connected to a signal analyzing device 1305 via an interface 1309. The signal analyzing device 1305 can be a personal computer, a hand phone, a signal analyzer or a specially designed reader. The interface 1309 between the base unit 1303 and the signal analyzing device 1305 comprises an universal serial bus (USB). In the system shown in FIG. 13, the acceleration from the vibration is converted to an electric signal by the wireless piezoelectric accelerometer 1301 and the electrical signal will be processed and digitalized before transmitted to the base unit 1303. Software implemented in the signal analyzing device 1305 processes the signal and graphically displays the vibration spectra. The time domain signal is typically transmitted to an analyzer, which comprises the mechanical vibration information, such as from a machine under monitoring. Useful information for diagnosing the machine health condition is extracted and analyzed.

Figure 14:
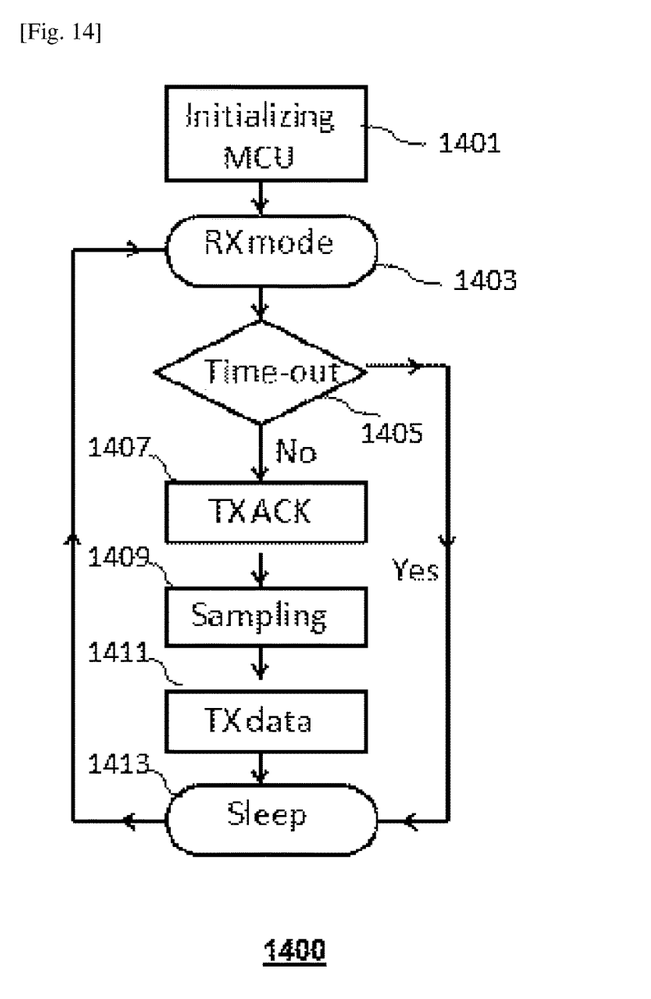
FIG. 14 depicts a flow diagram of the wireless piezoelectric accelerometer system when the wireless piezoelectric accelerometer is in a work mode.

FIG. 14 shows a flow chart of the operation of the wireless piezoelectric accelerometer in the system shown in FIG. 13. In most of the time, the wireless piezoelectric accelerometer 1301 is in a sleep mode 1413. It wakes up from the sleep mode 1413 in a predetermined time interval. The wireless piezoelectric accelerometer 1401 first goes into Receive (RX) mode 1403 to check for instruction from the base unit 1303. If an instruction is received, it will transmit an acknowledgement (TX ACK) 1407 to the base unit 1303 and start sampling 1409. Upon completion of the sampling 1409, the sampled data are transmitted 1411 to the base unit 1303, and the wireless piezoelectric accelerometer 1301 goes into a sleep mode 1413 to conserve energy. If no instruction is received from the base unit 1303 by the end of a time-out interval 1405, the wireless piezoelectric accelerometer 1301 will also go into the sleep mode 1413.

Figure 15:
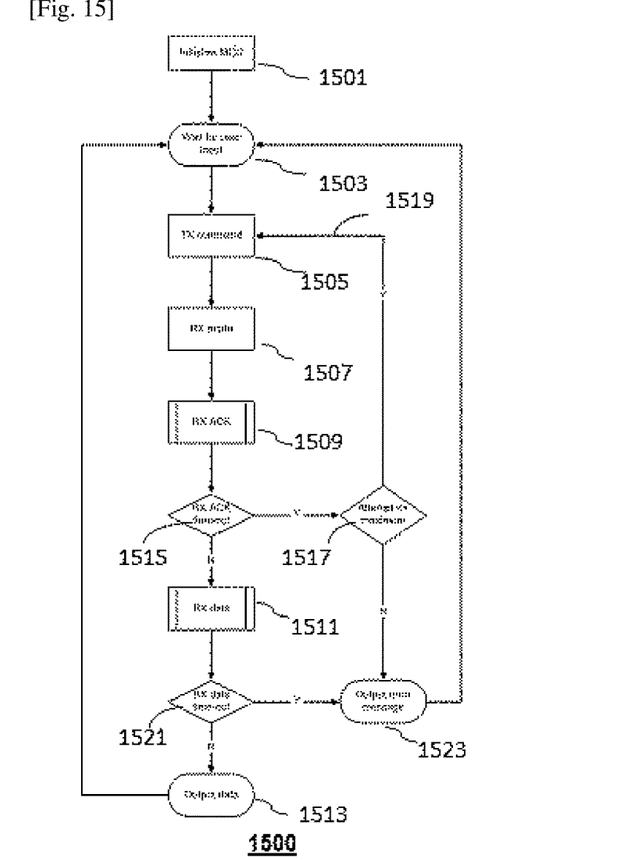
FIG. 15 depicts a flow diagram of a base unit in the wireless piezoelectric accelerometer system.

For completeness, FIG. 15 shows a flow chart 1500 of the operation of the base unit 1303. After the MCU is initialized 1501, the base unit 1303 runs continuously in a loop that first waits for user input 1503, by emulated serial communication (COM) port communication. The command with the wireless piezoelectric accelerometer identification (ID) and sampling parameters is transmitted 1505 and the base unit 1303 will go into the Receive mode 1507 to wait for the acknowledgement 1509 from the base unit 1303. If the acknowledgement is received 1509, the base unit 1303 will continue to wait for the transmission of the sampling data from the wireless piezoelectric accelerometer 1301. Upon receiving the sampling data 1511, the base unit will output 1513 the data by the emulated serial COM port. If no acknowledgement is received 1515 from the wireless accelerometer, the base unit 1303 will repeat the transmission 1519 of the command with the wireless piezoelectric accelerometer 1301 ID and the sampling parameters if the number of transmission attempts is less than 1517 a predetermined maximum number of attempts. If the number of transmission attempts exceeds the predetermined maximum number or if the time taken for the reception of sampling data 1511 exceeds a predetermined time-out period 1521, the sampling is considered to have failed and an error message will be output 1523.

Figure 16:
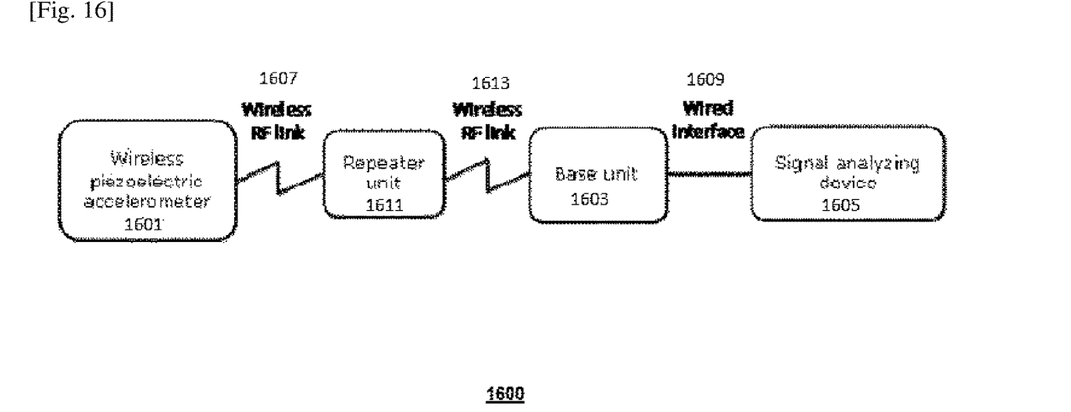
FIG. 16 depicts a diagram of another embodiment of a wireless piezoelectric accelerometer system, wherein a repeater unit is used between the wireless piezoelectric accelerometer and the base unit.

To extend communication range of the wireless piezoelectric accelerometer, FIG. 16 depicts a schematic diagram for extending the communication distance between a wireless piezoelectric accelerometer 1601 in accordance with the embodiments as described above and the base unit 1603 by introducing a repeater unit 1611. The repeater unit 1611 can receive 1607 or 1613 a wireless transmission from either the base unit 1603 or the wireless piezoelectric accelerometer 1601, and wirelessly retransmit 1613 or 1607 the data of the received wireless transmission to the next electrical component, i.e. either the wireless piezoelectric accelerometer 1601 or the base unit 1603. The repeater unit 1611 is deployed in a position which is within the wireless transmission range of both the wireless piezoelectric accelerometer 1601 and the base unit 1603, while the wireless piezoelectric accelerometer 1601 and the base unit 1603 may not be within the transmission range of each other.

Multiple repeater units 1611 can be used to further extend the distance between the wireless accelerometer 1601 and the base unit 1603, for example by having a first repeater unit 1611 deployed in a position which is within the wireless transmission range of both the wireless piezoelectric accelerometer 1601 and a second repeater unit 1611, and the second repeater unit 1611 deployed in a position which is within the wireless transmission range of the base unit 1603 and the first repeater unit 1611.

Thus it can be seen that a piezoelectric accelerometer and a system comprising thereof in accordance with the present embodiments have the advantages of compact, having a small size and weight, being able for wireless communication with eliminated EMI, they also have higher power efficiency and provide extended communication capability. While exemplary embodiments have been presented in the foregoing detailed description, it will be appreciated that a vast number of variations exist.

It will further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A wireless piezoelectric accelerometer, comprising:
a piezoelectric sensing element configured to sense mechanical acceleration and produce an electrical charge signal in response of the sensed mechanical acceleration;
a signal processing module (SPM) configured to convert the electrical charge signal into a voltage signal, and process and digitize the voltage signal, wherein the SPM comprises a primary SPM and a secondary SPM, and wherein the primary SPM comprises an amplifier circuit, and wherein the secondary SPM comprises an analog to digital converter (ADC) and a microcontroller (MCU); and
a wireless module configured to modulate and transmit the digitized voltage signal as wireless signals, wherein the piezoelectric sensing element, the SPM and the wireless module are packaged in a casing, and wherein the casing comprises an electromagnetic shielding chamber configured to enclose the piezoelectric sensing element and the primary SPM separate from the secondary SPM and the wireless module to shield the piezoelectric sensing element from electromagnetic interference; and wherein the casing further comprises a non-metallic portion located in relation to the wireless module so as to allow transmission of the wireless signals through the casing.

2. The wireless piezoelectric accelerometer in accordance with claim 1, wherein the casing comprises a metallic base including the electromagnetic shielding chamber and the non-metallic portion comprises plastic, wherein the metallic base comprises a metallic bottom and a metallic wall wrapping around the metallic bottom, and wherein the non-metallic portion and the metallic base are engageable so the piezoelectric sensing element and the primary SPM of the wireless piezoelectric accelerometer are enclosed within the electromagnetic shielding chamber.

3. The wireless piezoelectric accelerometer in accordance with claim 2, wherein the metallic bottom comprises a mounting portion for mounting the wireless piezoelectric accelerometer.

4. The wireless piezoelectric accelerometer in accordance with claim 1, wherein the piezoelectric sensing element is a miniaturized piezoelectric micro electromechanical system (MEMS) bending-mode sensor.

5. The wireless piezoelectric accelerometer in accordance with claim 1, wherein the piezoelectric sensing element is a piezoelectric shear-mode sensor.

6. The wireless piezoelectric accelerometer in accordance with claim 1, wherein the MCU is programmable to control the wireless piezoelectric accelerometer.

7. The wireless piezoelectric accelerometer in accordance with claim 2, further comprises a power supply module, wherein the wireless module and the power supply module are mounted on a print circuit board (PCB) which is immobilized within the metallic base.

8. The wireless piezoelectric accelerometer in accordance with claim 7, wherein the metallic base comprises one or more groove and ridge structures on an inner brim of the metallic wall, and wherein the PCB is interlocked in the groove structure between the ridge structures.

9. The wireless piezoelectric accelerometer in accordance with claim 2, wherein the metallic base is treated to comprise an insulation layer on its inner and external surfaces.

10. The wireless piezoelectric accelerometer in accordance with claim 1, wherein the casing has an overall height and a lateral width, and wherein the overall height is smaller than the lateral width.

11. The wireless piezoelectric accelerometer in accordance with claim 4, wherein the MEMS bending-mode sensor comprises a plurality of micro-machined silicon beams, wherein a piezoelectric thin film is coated on the plurality of micro-machined silicon beams.

12. The wireless piezoelectric accelerometer in accordance with claim 11, wherein the plurality of silicon beams comprise a plurality of interdigital electrodes (IDTs) configured to provide an in-plane polarization in the piezoelectric thin film.

13. The wireless piezoelectric accelerometer in accordance with claim 11, wherein the MEMS bending-mode sensor is immobilized onto the metallic bottom, wherein the plurality of micro-machined silicon beams are aligned in parallel with a main surface plane of the metallic bottom, such that the wireless piezoelectric accelerometer is configured to detect an acceleration in a direction perpendicular to the main surface plane of the metallic bottom.

14. The wireless piezoelectric accelerometer in accordance with claim 13, wherein the MEMS bending-mode sensor and the amplifier circuit are fabricated on a same silicon wafer.

15. The wireless piezoelectric accelerometer in accordance with claim 5, wherein the piezoelectric shear-mode sensor comprises a piezoelectric single crystal plate, wherein the piezoelectric shear-mode sensor is configured to convert a shear strain of the piezoelectric single crystal plate induced by an acceleration to an electric charge signal.

16. The wireless piezoelectric accelerometer in accordance with claim 15, wherein the metallic bottom comprises a central post protruding inwards in a direction perpendicular to a main surface of the metallic bottom to form a mounting portion for mounting the wireless piezoelectric accelerometer, wherein the piezoelectric shear-mode sensor is mounted on a wall of the central post within the metallic shielding chamber to detect acceleration in a direction perpendicular to the main surface of the metallic bottom.

17. The wireless piezoelectric accelerometer in accordance with claim 16, wherein the piezoelectric single crystal plate is a piezoelectric lead magnesium niobate-lead titanate (PMN-PT) single crystal plate or a piezoelectric lead zinc niobate-lead titanate (PZN-PT) single crystal plate with a perovskite crystal structure, wherein a polarization direction of the piezoelectric single crystal plate is aligned with an axis direction of the central post, such that the wireless piezoelectric accelerometer is configured to detect the acceleration in a direction parallel with the central post.

18. The wireless piezoelectric accelerometer in accordance with claim 1, wherein walls of the electromagnetic shielding chamber comprise a first metal having a high permeability for blocking low frequency magnetic fields and a second metal having a high conductivity for electric field shielding.

19. A wireless piezoelectric accelerometer system, comprising:
a wireless piezoelectric accelerometer comprising:
a piezoelectric sensing element configured to sense mechanical acceleration and produce an electrical charge signal in response of the sensed mechanical acceleration;
a signal processing module (SPM) configured to convert the electrical charge signal into a voltage signal, and process and digitize the voltage signal, wherein the SPM comprises a primary SPM and a secondary SPM, and wherein the primary SPM comprises an amplifier circuit, and wherein the secondary SPM comprises an analog to digital converter (ADC) and a microcontroller (MCU); and
a wireless module configured to modulate and transmit the digitized voltage signal as wireless signals, wherein the piezoelectric sensing element, the SPM and the wireless module are packaged in a casing, and wherein the casing comprises an electromagnetic a metallic shielding chamber configured to enclose the piezoelectric sensing element and the primary SPM separate from the secondary SPM and the wireless module to shield the piezoelectric sensing element from electromagnetic interference; and wherein the casing further comprises
a non-metallic portion located in relative to the wireless module to allow transmission of the wireless signals through the casing;
a base unit; and
a signal analyzing device, wherein the wireless piezoelectric accelerometer and the base unit are connected via a wireless link, and wherein the base unit and the signal analyzing device are connected via an interface.

20. The wireless piezoelectric accelerometer system in accordance with claim 19, wherein the base unit is configured to control the wireless piezoelectric accelerometer to operate in a sleep mode and a wake mode.

21. The wireless piezoelectric accelerometer system in accordance with claim 19, further comprising one or more repeater units between the wireless piezoelectric accelerometer and the base unit so as to extend a communication range between the wireless piezoelectric accelerometer and the base unit.

22. The wireless piezoelectric accelerometer system in accordance with claim 19, wherein walls of the electromagnetic shielding chamber comprise a first metal having a high permeability for blocking low frequency magnetic fields and a second metal having a high conductivity for electric field shielding.

* * * * *